US012755629B2

(12) United States Patent
Gassmann et al.

(10) Patent No.: US 12,755,629 B2
(45) Date of Patent: Oct. 6, 2026

(54) METHOD FOR CREATING AN ENVIRONMENT MODEL FOR A SERVICE AREA

(71) Applicant: Robert Bosch GmbH, Stuttgart (DE)

(72) Inventors: Bernd Gassmann, Aspach (DE); Jonas Guenther, Schaafheim (DE); Tobias Frye, Braunschweig (DE)

(73) Assignee: Robert Bosch GmbH, Stuttgart (DE)

( * ) Notice: Subject to any disclaimer, the term of this patent is extended or adjusted under 35 U.S.C. 154(b) by 215 days.

(21) Appl. No.: 18/607,378

(22) Filed: Mar. 15, 2024

(65) Prior Publication Data

US 2024/0404399 A1 Dec. 5, 2024

(30) Foreign Application Priority Data

Jun. 1, 2023 (DE) ..................... 10 2023 205 126.5

(51) Int. Cl.
*G08G 1/00* (2006.01)
*G08G 1/01* (2006.01)
*G08G 1/04* (2006.01)
*G08G 1/052* (2006.01)

(52) U.S. Cl.
CPC ........... *G08G 1/052* (2013.01); *G08G 1/0112* (2013.01); *G08G 1/04* (2013.01)

(58) Field of Classification Search
CPC ........ G08G 1/052; G08G 1/0112; G08G 1/04; G08G 1/0116; G08G 1/00; H04W 4/021; H04W 4/029; H04W 4/38; H04W 4/40
USPC .......................................................... 701/119
See application file for complete search history.

(56) References Cited

U.S. PATENT DOCUMENTS

| | | | | |
|---|---|---|---|---|
| 10,796,201 | B2 | 10/2020 | Li et al. | |
| 11,480,435 | B2 | 10/2022 | Li et al. | |
| 2010/0256898 | A1 * | 10/2010 | Gassner | G08G 1/01 701/117 |
| 2020/0082219 | A1 * | 3/2020 | Li | G06F 18/2148 |
| 2023/0421247 | A1 * | 12/2023 | Vaughan | H04B 7/19 |

FOREIGN PATENT DOCUMENTS

| | | | |
|---|---|---|---|
| DE | 102007042877 | A1 | 3/2009 |
| DE | 102017212644 | A1 | 1/2019 |
| EP | 4351178 | A1 | 4/2024 |

* cited by examiner

*Primary Examiner* — Shardul D Patel
(74) *Attorney, Agent, or Firm* — Norton Rose Fulbright US LLP

(57) ABSTRACT

A method for creating an environment model for a service area, wherein within the service area, a service for the infrastructure-based support of an at least partially automated networked motor vehicle is provided. The method includes: dividing the service area into multiple geographic segments; receiving sensor data, which are attributed with geographic coordinates, and assigning the sensor data to at least one geographic segment as a function of the geographic coordinates; assigning a geographic segment to a selected process instance; computing a respective partial environment model for each geographic segment by the process instance assigned to the geographic segment on the basis of the received sensor data (fusion of the sensor data).

17 Claims, 4 Drawing Sheets

METHOD FOR CREATING AN ENVIRONMENT MODEL FOR A SERVICE AREA

CROSS REFERENCE

The present application claims the benefit under 35 U.S.C. § 119 of German Patent Application No. DE 10 2023 205 126.5 filed on Jun. 1, 2023, which is expressly incorporated herein by reference in its entirety.

FIELD

The present invention relates to a method for creating an environment model for a service area, wherein a service is provided within the service area for the infrastructure-based support of an at least partially automated networked motor vehicle. The present invention further relates to an infrastructure system for the infrastructure-based support of networked motor vehicles that are driven in at least partially automated fashion. The present invention further relates to a computer program.

BACKGROUND INFORMATION

A method is described in U.S. Patent No. 10,796,201 B2 for controlling a motor vehicle based on a panoptic map. The method comprises receiving an input from at least one sensor of the motor vehicle, generating an instance map and a semantic map from the input, and generating the panoptic map from the instance map and the semantic map based on a binary mask.

For applications in the area of infrastructure-based automated driving, sensor data are usually combined in a preprocessed form (e.g., in the form of object lists). This combination is referred to as sensor fusion or sensor data fusion and can transform, e.g., measurement data of different sensor types and/or of different sensors of the same type into a common data structure, so that this can be used by a downstream algorithm (e.g., for travel planning).

If the processing of the sensor data is transferred into a cloud, then, depending on the load situation, new processing instances may be generated or removed in automated fashion, which allows for efficient processing. This can result in an additional reliability gain, because the processing does not enter into an overload situation as long as new instances are available. Reducing instances at low load reduces the costs of processing.

A substantial portion of processing is dedicated to fusion, that is, combining the various object lists into a single resulting object list. This resulting object list represents an environment model, that is, a state of the area valid at a specific point in time. Currently, algorithms are used in fusion that combine the newly received sensor message with the existing state and thereby ascertain a new state. Such state-related processing makes it difficult, however, to distribute the sensor data processing for a service area over multiple process instances, because all instances would have to use this state as common information. This is particularly problematic in large service areas, as may occur in infrastructure systems (e.g., a long tunnel), for which no single instance having sufficient computing capacity exists.

SUMMARY

It is an objective of the present invention to provide an efficient method for the computation of an environment model for a service area, wherein within the service area a service is provided for the infrastructure-based support of an at least partially automated networked motor vehicle.

It is a further object of the present invention to provide an infrastructure system for supporting the travel of networked motor vehicles driven in at least partially automated fashion, which allows for an efficient computation of an environment model for a service area.

According to a first aspect of the present invention, a method for creating an environment model for a service area is provided, wherein within the service area a service for the infrastructure-based support of an at least partially automated networked motor vehicle is provided. According to an example embodiment of the present invention, the method comprises at least the following steps:

- dividing the service area into multiple geographic segments,
- receiving sensor data, which are attributed with geographic coordinates, and assigning the sensor data to at least one geographic segment as a function of the geographic coordinates;
- assigning a geographic segment to a selected process instance,
- computing a respective partial environment model for each geographic segment by the process instance assigned to the geographic segment on the basis of the received sensor data (fusion of the sensor data).

According to a second aspect of the present invention, a system for creating an environment model for a service area is proposed, wherein within the service area a service is provided for the infrastructure-based support of an at least partially automated networked motor vehicle. The system is designed to carry out a method according to the first aspect of the present invention. For this purpose, the system according to an example embodiment of the present invention comprises:

- a plurality of process instances,
- a receiver interface for receiving sensor data, which are attributed with geographic coordinates.

According to an example embodiment of the present invention, the system is designed to divide the service area into multiple geographic segments. A processor of the system is designed to allocate the received sensor data to at least one geographic segment as a function of the geographic coordinates and to assign each of the geographic segments to a selected process instance. Each process instance is designed to compute, on the basis of the received sensor data, a respective partial environment model for each geographic segment assigned to this process instance.

According to a third aspect of the present invention, a computer program is provided. According to an example embodiment of the present invention, the computer program comprises commands that prompt a computer, when executing the computer program, to carry out a method according to the first aspect of the present invention.

According to a fourth aspect of the present invention, a machine-readable storage medium is provided, on which the computer program according to the third aspect of the present invention is stored.

In this context, a process instance may be understood for example as a cloud instance or a virtual or a genuine computer or a process that may be distributed over multiple computers or multiple processor cores.

The service area may be, for example, a portion of a road infrastructure, in particular an intersection, an entrance ramp or a tunnel entrance or any road segment in which at least partially automated networked motor vehicles may profit from a service of the infrastructure-based support of their automated driving functions by data or instructions. The service may for example consist in the transmission of environment information to the at least partially automated networked motor vehicle in the form of object lists and/or driving instructions and/or driving recommendations.

Sensor data, which are used in accordance with the present invention for computing partial environment models, are for example data that are recorded or generated by environment sensors. These environment sensors may comprise at least one stationary environment sensor that is situated within the service area. Examples for such environment sensors are 2D or 3D camera systems, LIDAR sensors or radar sensors. Other sensor types are possible as well, such as ultrasonic sensors, pressure sensors or light barriers, for example. One skilled in the art is familiar with further sensor types.

Alternatively or additionally, sensor data may be generated or recorded by at least one environment sensor of a motor vehicle traveling within the service area. Motor vehicles, in particular at least partially automated networked motor vehicles, normally have one or multiple environment sensors such as 2D or 3D camera systems, LIDAR sensors, ultrasonic sensors or radar sensors. The sensor data recorded by these motor vehicle environment sensors may be transmitted from the motor vehicles to an infrastructure system, for example by V2X communication.

The sensor data may be raw data or preprocessed data, for example object lists.

The sensor data may comprise for example image data and/or distance data and/or speed data and/or a point cloud. From this information, it is possible for example to recognize and classify objects within a geographic segment. In this way, it is possible to create an object list and/or a partial environment model for the respective geographic segment.

According to an example embodiment of the present invention, the number and/or the sizes of the geographic segments are preferably adapted dynamically. Particularly preferably, the adaptation occurs as a function of an expected number of objects within the respective geographic segment and in particular in such a way that the number of the expected objects remains substantially the same for each geographic segment. This makes it possible to ensure that the computing load is always evenly distributed across the process instances involved.

According to an example embodiment of the present invention, alternatively or additionally, the assignment of a respective geographic segment to a process instance may be adapted dynamically, in particular as a function of an expected number of objects within the respective geographic segment. As a result, it is possible to utilize in particular the computing capacity of the process instances involved in optimized fashion. In case of a particularly high expected number of objects, for example at specific times of day or in the case of specific events, additional process instances may be used.

In a preferred embodiment of the present invention, the size and shape of the geographic segment may be received via an external interface, for example from a V2X protocol stack. If, for example, a specific geographic division of the service area is already utilized in the transmission of V2X messages (as described, for example, in European Patent Application No. EP 22 19 9984), it is possible to adopt the segments used by the V2X protocol stack. This yields the advantage, for example, that the size and shape of the geographic segments are efficiently determined, without requiring additional computing capacity.

Advantageously, it may be provided that multiple geographic segments are assigned to one process instance. This embodiment is advantageous particularly if these are segments having a small number of expected objects. The process instance may thus be utilized in optimized fashion.

In an advantageous embodiment of the present invention, a specific process instance may be assigned to exactly one geographic segment, the geographic segment varying in size. The dynamic adaptation of the size of the geographic segment advantageously makes it possible to utilize a specific process instance in optimized fashion in this embodiment as well, in particular in that the size of the geographic segment is varied as a function of the number of objects within the segment. Particularly preferably, the size of the geographic segment may be adapted in such a way that an expected number of objects within the segment remains substantially constant.

In one advantageous embodiment of the present invention, the sensor data may be distributed to the assigned process instance with the aid of a coordination instance (dispatcher) or with the aid of an algorithm. This makes it possible to distribute the incoming sensor data to the process instances. For latency reasons, a classical dispatcher, which receives, evaluates and forwards the messages, is omitted. Instead, an area (e.g., multiple segments, a point set for a boundary line, etc.) may be assigned to the respective processes of an instance via a message. A distribution algorithm is then able to write the required information into a common database or a cache, which the process instances are able to access and thus are able to configure the filtering of the messages comprising the sensor data. Such a distribution algorithm is then able to receive load information as input parameters (e.g., a current number of the objects in the service area) and derive from this the distribution of the work to the process instances.

According to an example embodiment of the present invention, a partial environment model is created for each geographic segment. Depending on the type of further use intended for the results, this segmentation may require an additional integration step in order to combine the partial results (the partial environment models or partial states). This would be necessary, for example, in order to transfer the overall state of the service area to a planning or processing instance or to produce a single message for the entire service area. This integration step is facilitated or even unnecessary, if the further processing is also able to handle a segmented environment model.

In a preferred embodiment of the present invention, an overall environment model for the entire service area may be determined from the partial environment models in an additional integration step.

According to a preferred embodiment of the present invention, the division of the service area into geographic segments may be performed in such a way that two geographic segments are defined in such a way that they adjoin each other directly. This means in particular that the segments terminate flush with each other so that there is no overlap between two segments. This embodiment has the advantage that at a given point in time each object is uniquely assigned to a specific segment and that sensor data do not have to be processed twice.

According to an alternative preferred embodiment of the present invention, the division of the service area into geographic segments may be performed in such a way that at least two of the geographic segments are defined in such a way that they have at least one overlapping spatial region.

This has advantages in particular if many objects move between the segments resulting in a great exchange. The fusion is then able to observe an object as long as it moves within the overlapping region and is thereby able to compute an initial state so that the subsequent positions of the object can be predicted better when it proceeds to migrate into the "inner" portion, that is, the non-overlapping portion, of the segment.

This increases the accuracy and confidence of the entire application. Taking such objects into account advantageously prevents objects from being counted twice or so-called ghost objects from arising. This advantage, however, is purchased at the price of rendering the integration of the data more difficult, since objects located in the overlapping region may be represented differently in the segments. The reason for this may be a different observation duration in the segments. In order to solve this, it may be assumed for example that the partial environment model, in the segment of which an object stayed for longer, provides the more accurate information. In order to be able to utilize this, it is possible for example to output for each object an attribute for the duration of its stay in the observed segment.

If an object has been assigned a unique identification and this identification is to be maintained when the object transitions from a first geographic segment into a second geographic segment, there is for example the possibility that the first process instance, to which the first geographic segment is assigned, recognizes based on the movement of the object that an object crosses the boundary to the second geographic segment. In this case, a corresponding message comprising a position and the unique identification of the object is transmitted to the second process instance, to which the second geographic segment is assigned.

According to an example embodiment of the present invention, alternatively or additionally, a fast memory (e.g., a Redis cache) may be provided for such objects, in which the unique identification and position are stored. When an object transitions from a first geographic segment into a second geographic segment, the respective process instance is then able to take over the data of the object from the fast memory and continue to maintain it.

In the event that in the above-described embodiment the first geographic segment and the second geographic segment overlap, processing may be implemented as follows: An object, which migrates from the core region (that is, the region of the geographic segment that does not overlap) of the first geographic segment into the overlapping region, continues to be processed by the first process instance, which transmits the results. The second process instance will detect the object for the first time when it enters into the overlapping region and initially can process the object but cannot yet transmit it as part of a partial environment model. Only when the object enters the core region of the second geographic segment, will the first process instance stop the processing and the second process instance will take over. This prevents the object from existing twice. In the event that a unique identification of an object is not necessary, the results of both process instances can be combined without the process instances having to exchange information. In the event that for each object a unique identification must be retained, this unique identification for the objects in the overlapping region (but only for these) may be handed over by communication or the fast memory as described above.

In the computation of a respective partial environment model, objects may be advantageously determined, which because of their moving direction and speed will leave a first geographic segment within a certain time span and cross over into an adjacent or overlapping second geographic segment. In this case, information about such objects may be handed over by the process instance assigned to the first geographic segment to the process instance assigned to the second geographic segment and/or information about such objects may be taken into account in the computation of the overall environment model.

In an advantageous embodiment of the present invention, at least one of the partial environment models may be processed further and results of the further processing may be transmitted to at least one at least partially automated networked motor vehicle. A result of the further processing may comprise, for example, a recommended action, a control command, or a warning. The result of the further processing may be transmitted to the at least partially automated networked motor vehicle for example by V2X communication.

The present invention makes it possible to distribute the processing of objects and the creation of environment models to multiple process instances. These are then able to execute the tasks in parallel and thereby gain a speed advantage. On the other hand, the process instances may be scaled depending on load (e.g., high load with many objects during peak traffic hours, or low load in the dead of night), so that costs may be saved overall while nevertheless no reduction in service quality is to be expected at high load.

The present invention is based on the idea of dividing a service area into geographic segments. For this purpose, the segments may be kept comparatively small, be it geographically or with respect to an expected number of appearing objects. This makes it possible to ensure that in each case a certain maximum number n of objects are processed by a process instance. The sensor data, which are attributed with geographic coordinates, may be easily filtered by the individual instances without having to be distributed by a further instance. The size of the segments and/or the number n of the appearing object is preferably dynamically adaptable. This makes it possible to distribute the processing to multiple instances, as a result of which these may then be processed in parallel on the one hand and, on the other hand, may be scaled depending on load (e.g., high load with many objects during peak traffic hours, or low load in the dead of night), allowing for faster processing and cost savings. The present invention makes it possible to make use of the advantages of cloud-based computation, in particular parallelization effects and multiplex gains, and thus to achieve higher functional reliability by way of redundancies and multiple computations.

The formulation "networked motor vehicle" comprises a motor vehicle, which has a suitable communication device, using which the networked motor vehicle is able to exchange data with other road users, in particular with an infrastructure system. For this purpose, a wireless data connection is established, via which the networked motor vehicle is able to transmit and/or receive data. This may be preferably a radio link, for example a mobile radio link or a direct wireless link. Such a communication between a motor vehicle and another road user is also known as V2X or C2X communication.

The formulation "at least partially automated" comprises one or several of the following cases: assisted driving, partially automated driving, highly automated driving, fully automated driving of a motor vehicle.

Assisted driving means that a driver of the motor vehicle permanently performs either the lateral or the longitudinal guidance of the motor vehicle. The respectively other driving task (that is, controlling the longitudinal or the lateral guidance of the motor vehicle) is performed automatically. That is to say that in assisted driving of the motor vehicle either the lateral guidance or the longitudinal guidance is controlled automatically.

Partially automated driving means that in a specific situation (for example: driving on a freeway, driving within a parking facility, passing an object, driving within a traffic lane, which is defined by lane markers) and/or for a certain time period, a longitudinal guidance and a lateral guidance of the motor vehicle are controlled automatically. It is not necessary for a driver of the motor vehicle to control the longitudinal and lateral guidance of the motor vehicle manually.

Nevertheless, the driver must permanently monitor the automatic control of the longitudinal and lateral guidance so as to be able to intervene manually when necessary. The driver must always be prepared to take complete control of driving the motor vehicle.

Highly automated driving means that for a certain time period in a specific situation (for example: driving on a freeway, driving within a parking facility, passing an object, driving within a traffic lane, which is defined by lane markers) a longitudinal guidance and a lateral guidance of the motor vehicle are controlled automatically. It is not necessary for a driver of the motor vehicle to control the longitudinal and lateral guidance of the motor vehicle manually. It is not necessary for the driver permanently to monitor the automatic control of the longitudinal and lateral guidance so as to be able to intervene manually when necessary. When necessary, a takeover request is automatically output to the driver for taking over the control of the longitudinal and lateral guidance, in particular with sufficient time to respond. Thus, the driver must be potentially able to take control of longitudinal and lateral guidance. Limits of the automatic control of the lateral and longitudinal guidance are detected automatically. In highly automated driving, it is not possible in every initial situation to bring about a risk-minimized state automatically.

Fully automated driving means that in a specific situation (for example: driving on a freeway, driving within a parking facility, passing an object, driving within a traffic lane, which is defined by lane markers) a longitudinal guidance and a lateral guidance of the motor vehicle are controlled automatically. It is not necessary for a driver of the motor vehicle to control the longitudinal and lateral guidance of the motor vehicle manually. It is not necessary for the driver to monitor the automatic control of the longitudinal and lateral guidance so as to be able to intervene manually when necessary. Prior to a termination of the automatic control of the lateral and longitudinal guidance, a request is automatically output to the driver to take over the task of driving (controlling the lateral and longitudinal guidance of the motor vehicle), in particular with sufficient time to respond. If the driver does not take over the task of driving, the motor vehicle is automatically returned to a risk-minimized state. Limits of the automatic control of the lateral and longitudinal guidance are detected automatically. In all situations it is possible to return the motor vehicle automatically to a risk-minimized system state.

Driverless control or driving means that regardless of a specific application case (for example: driving on a freeway, driving within a parking facility, passing an object, driving within a traffic lane, which is defined by lane markers) a longitudinal guidance and a lateral guidance of the motor vehicle are controlled automatically. It is not necessary for a driver of the motor vehicle to control the longitudinal and lateral guidance of the motor vehicle manually. It is not necessary for the driver to monitor the automatic control of the longitudinal and lateral guidance so as to be able to intervene manually when necessary. The longitudinal and lateral guidance of the motor vehicle is thus controlled automatically for example on all types of roads, in all speed ranges and environmental conditions. The entire driving task of the driver is thus taken over automatically. The driver is therefore no longer required. That is, even without driver, the motor vehicle is able to drive from any starting position to any destination position. Potential problems are resolved automatically, that is, without the help of the driver.

Remote-controlling the motor vehicle means that a lateral and longitudinal guidance of the motor vehicle are controlled remotely. This means, for example, that remote control signals for controlling the lateral and longitudinal guidance remotely are transmitted to the motor vehicle. Remote control is implemented for example with the aid of a remote control device.

BRIEF DESCRIPTION OF THE DRAWINGS

Specific embodiments of the present invention are described in detail with reference to the figures.

DETAILED DESCRIPTION OF EXAMPLE EMBODIMENTS

Figure 1:
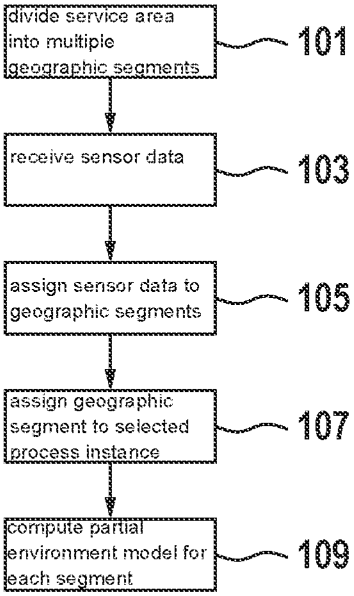
FIG. 1 shows a flow chart of a method according to the first aspect of the present invention.

Identical elements are designated by the same reference numerals in the following description of the exemplary embodiments of the present invention, a repeated description of these elements being omitted if indicated. The figures represent the subject matter of the present invention only schematically.

FIG. 1 shows a flow chart of a method for creating an environment model for a service area, wherein a service is provided within the service area for the infrastructure-based support of an at least partially automated networked motor vehicle. In step 101, the service area is divided into multiple geographic segments. In step 103, sensor data are received, which are attributed with geographic coordinates. In step 105, the sensor data are assigned to at least one geographic segment as a function of the geographic coordinates. In step 107, a respective geographic segment is assigned to a selected process instance. In step 109, a respective partial environment model is computed for each geographic segment by the process instance assigned to the geographic segment on the basis of the received sensor data.

Figure 2:
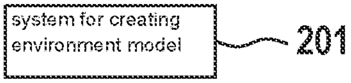
FIG. 2 shows a system according to the second aspect of the present invention.

FIG. 2 schematically shows a system 201 for creating an environment model for a service area, wherein a service is provided within the service area for the infrastructure-based support of an at least partially automated networked motor vehicle. The system 201 is designed to carry out a method according to the first aspect of the present invention. The system 201 comprises (not shown here):

at least one processor comprising a plurality of process instances, a receiver interface for receiving sensor data, which are attributed with geographic coordinates, wherein the system is designed to divide the service area into multiple geographic segments and wherein the processor is designed to allocate the received sensor data to at least one geographic segment as a function of the geographic coordinates and to assign each of the geographic segments to a selected process instance, and wherein each process instance is designed to compute a respective partial environment model for each geographic segment assigned to this process instance on the basis of the received sensor data.

Figure 3:
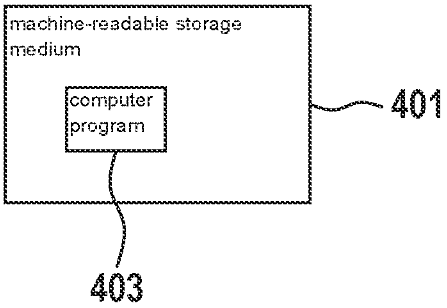
FIG. 3 shows a machine-readable storage medium according to the fourth aspect including a computer program according to the third aspect of the present invention.

FIG. 3 shows a machine-readable storage medium 401, on which a computer program 403 is stored. The computer program 403 comprises commands that prompt a computer, when executing the computer program 403, to carry out a method according to the first aspect.

Figure 4:
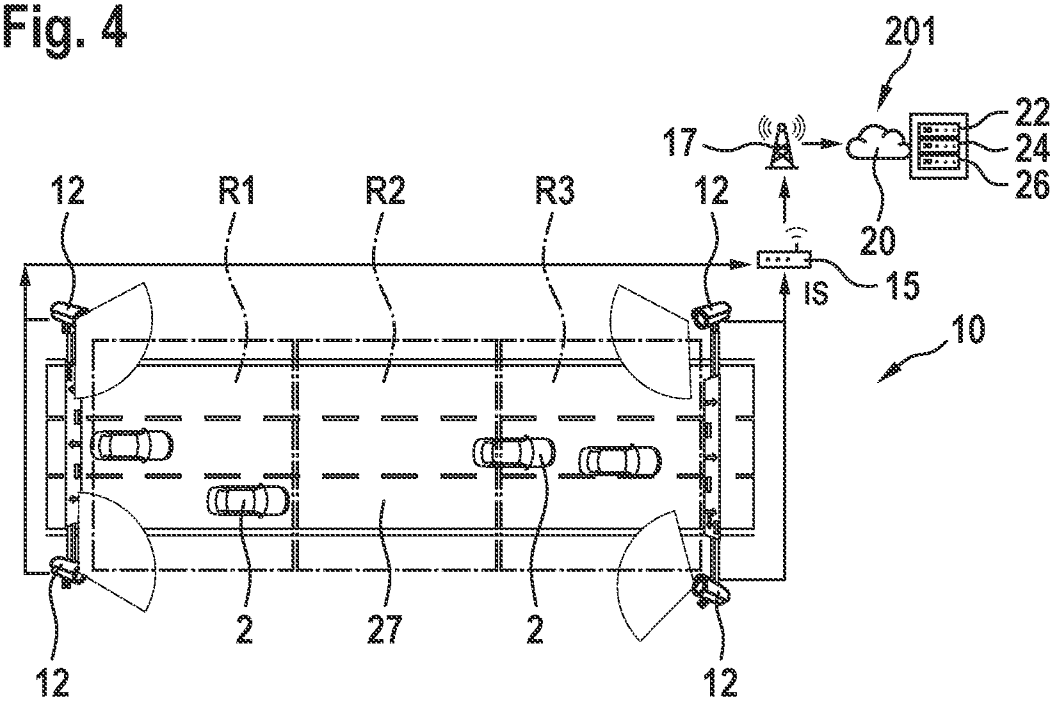
FIG. 4 shows a service area including a system according to a first example embodiment of the second aspect of the present invention.

FIG. 4 shows a service area 10, which comprises a three-lane roadway 27. The service area 10 is monitored by four environment sensor systems 12, which in this example take the form of stationary camera systems. Environment sensor systems record sensor data and attribute these with geographic coordinates.

The environment sensor systems 12 transmit their sensor data to an infrastructure system 15. The infrastructure system 15 transmits the sensor data via a transmitting device 17 to a remote cloud server. The cloud server serves as system 201 for creating an environment model for the service area 10, as a result of which it is possible to provide a service within the service area 10 for the infrastructure-based support of at least partially automated networked motor vehicles 2. The system 201 comprises a processor 20, which in turn includes a plurality of process instances 22, 24, 26.

If the computing capacity of a cloud instance is not sufficient for creating the environment model for the entire service area 10, it is now possible, as shown in FIG. 4, to divide the service area 10 into multiple geographic segments. In the illustrated example, the service area 10 is divided into three geographic segments R1, R2 and R3. Each environment model of a segment can be processed or computed by a separate process instance. In this context, a process instance can be understood as a cloud instance or a virtual or a genuine computer or a process that may be distributed over multiple processors or multiple processor cores. Subsequently, the individual environment models or results may be transferred into a common object list. The processor 20 is designed to allocate the received sensor data to at least one geographic segment R1, R2 or R3 as a function of the geographic coordinates and to assign each of the geographic segments to a selected process instance 22, 24, 26. In the illustrated example, sensor data relating to segment R1 are assigned to process instance 22, sensor data relating to segment R2 are assigned to process instance 24 and sensor data relating to segment R3 are assigned to process instance 26. Each of the process instances 22, 24, 26 is designed to compute, on the basis of the received sensor data, a respective partial environment model for the geographic segment R1, R2, R3 respectively assigned to this process instance 22, 24, 26.

The geographic segments are represented by way of example and may also be divided differently depending on the number and location of the vehicles, for example one region per traffic lane.

Figure 5:
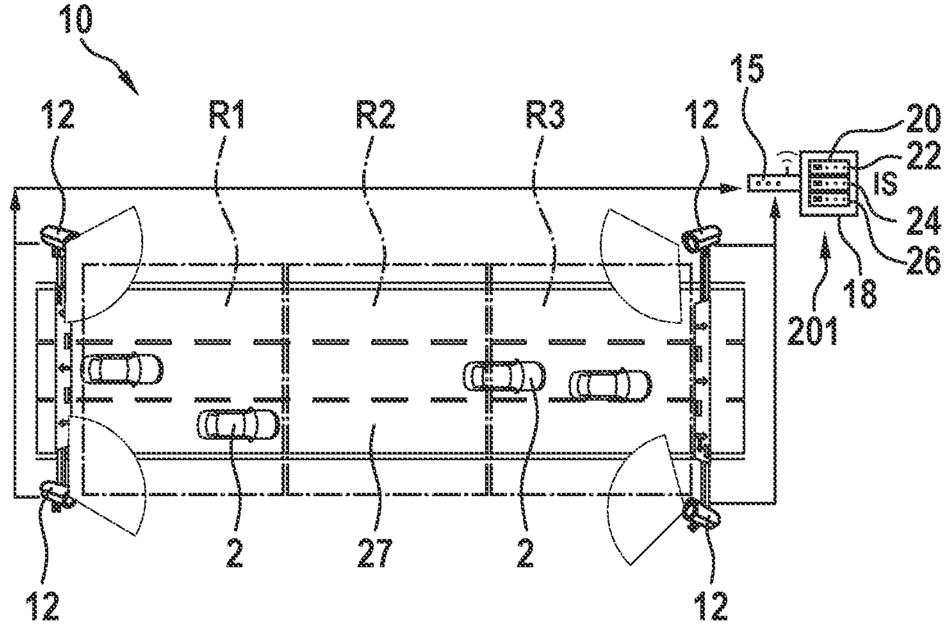
FIG. 5 shows a service area including a system according to a second example embodiment of the second aspect of the present invention.

FIG. 5 shows a service area 10, which comprises a three-lane roadway 27. The service area 10 is monitored by four environment sensor systems 12, which in this example take the form of stationary camera systems. Environment sensor systems record sensor data and attribute these with geographic coordinates. The environment sensor systems 12 transmit their sensor data to an infrastructure system 15. In this example, the infrastructure system 15 comprises a local server 18. The server 18 serves as system 201 for creating an environment model for the service area 10, as a result of which it is possible to provide a service within the service area 10 for the infrastructure-based support of at least partially automated networked motor vehicles 2. The system 201 comprises a processor 20, which in turn includes a plurality of process instances 22, 24, 26. The system 201 additionally comprises a receiver interface for receiving the sensor data. Analogous to the embodiment shown in FIG. 4 (cloud), the service area 10 is divided into three geographic segments R1, R2 and R3. Each segment may be processed or computed by its own process instance 22, 24, 26. Subsequently, the results may be transferred into a common object list. The processor 20 is designed to allocate the received sensor data to at least one geographic segment R1, R2 or R3 as a function of the geographic coordinates and to assign each of the geographic segments to a selected process instance 22, 24, 26. In the illustrated example, sensor data relating to segment R1 are assigned to process instance 22, sensor data relating to segment R2 are assigned to process instance 24 and sensor data relating to segment R3 are assigned to process instance 26. Each of the process instances 22, 24, 26 is designed to compute, on the basis of the received sensor data, a respective partial environment model for each geographic segment R1, R2, R3 assigned to this process instance 22, 24, 26.

Figure 6:
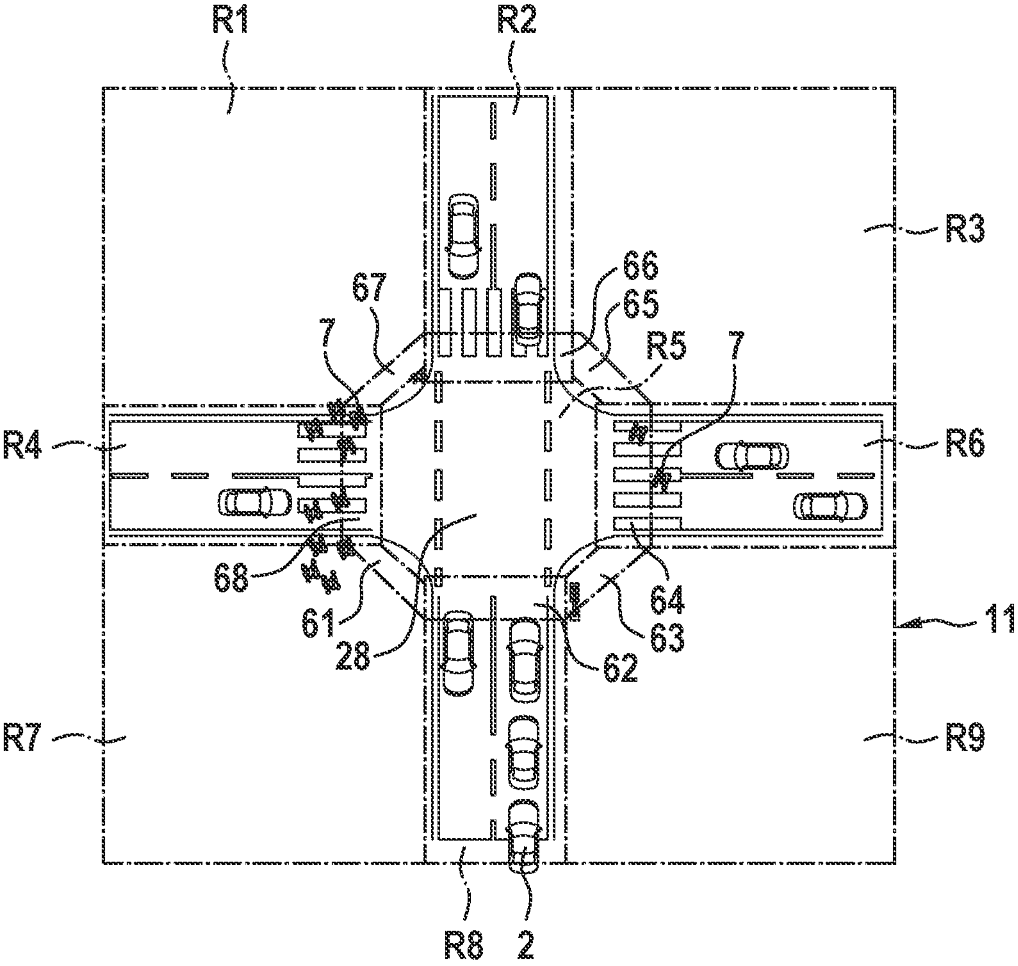
FIG. 6 shows a service area including a system according to a third example embodiment of the second aspect of the present invention.

FIG. 6 shows a service area 11, which comprises an intersection 28. In this example, the service area 11 is divided into nine segments R1-R9.

It may be assumed by way of example that the road leading from left to right in the illustration has heavier traffic than the road leading from top to bottom in the illustration. Based on a usual traffic density, the service area 11 may be covered by two process instances, for example. A first process instance, for example, may monitor the segments R2, R5 and R8, while a second process instance may monitor the remaining segments R1, R3, R4, R6, R7 and R9. When, for example at night, the traffic subsides, one process instance may monitor all segments. If, in a case of high load, for example an event, many pedestrians 7 are crossing the intersection 28 and at the same time many vehicles 2 are traveling the intersection 28, the number of objects per segment rises, especially for segments R2, R4, R5, R6 and R8, and the processing units forming the process instances would come under load. This may be ascertained, for example, by monitoring the current CPU load, the computing time, and the number of detected objects. In response, additional process instances may be activated, so that, for example, the segments R2, R4, R5, R6 and R8 are each processed by a separate process instance, and that segments R1, R3, R7 and R9 together are processed by a single process instance.

Segments R1-R9 have overlapping regions 61-68. Thus, segments R1 and R5 overlap in overlapping region 67, segments R2 and R5 overlap in overlapping region 66, segments R3 and R5 overlap in overlapping region 65, segments R4 and R5 overlap in overlapping region 68, segments R6 and R5 overlap in overlapping region 64, segments R7 and R5 overlap in overlapping region 61, segments R8 and R5 overlap in overlapping region 62 and segments R9 and R5 overlap in overlapping region 63. Thus, segment R5, which covers the central region of the intersection, and thus the most safety-critical region, has overlapping regions 61-68 with all other geographic segments R1, R2, R3, R4, R6, R7, R8 and R9. An object such as, e.g., the pedestrian 7 would be processed both by the process instance of segment R5 as well as by the process instance of segment R6. Advantageously, this makes it possible to utilize the knowledge/the data about the history of the movement of the object in order to compute the movement of the object as well as to maintain the continuity of the identity of the object.

Figure 7:
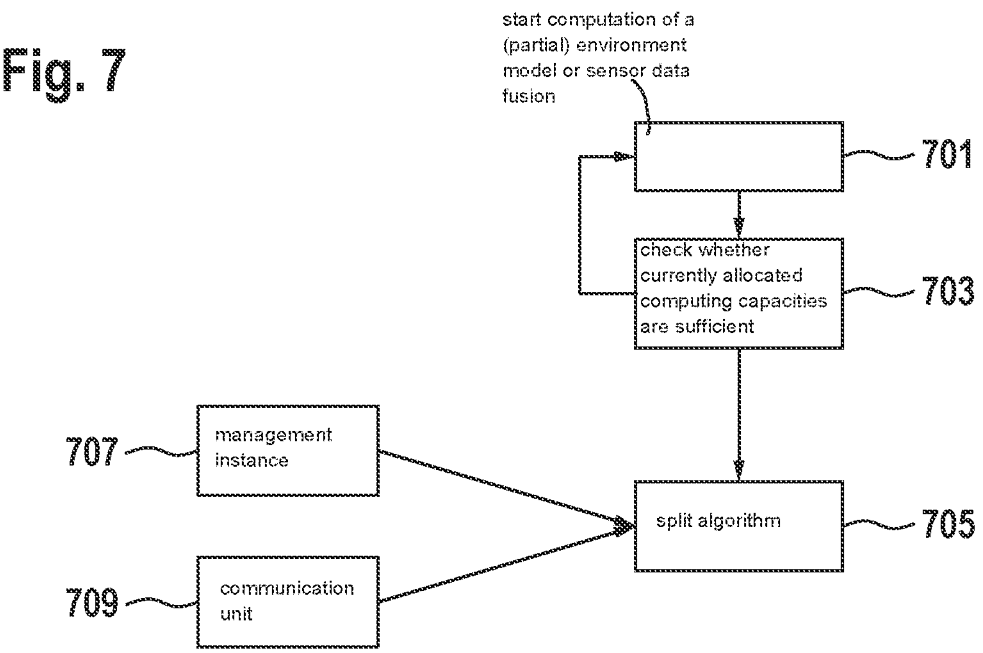
FIG. 7 shows a flow chart of a portion of a preferred specific embodiment of a method according to the first aspect of the present invention.

FIG. 7 illustrates a possible process for the dynamic division of a service area and for the dynamic allocation of corresponding geographic segments to process instances. In a first step, the computation of a (partial) environment model or the sensor data fusion is started—if applicable, for every process instance involved. In step 703, a check is performed to determine whether the currently allocated computing capacities are sufficient, in particular within specific tolerances. If this is the case, the computation in accordance with step 701 may continue. If sufficient computing capacity is not (no longer) available, the service area is divided further into multiple geographic segments. This may be done by a so-called split algorithm (705). In the process, a check is performed, for example, to determine whether a division into different geographic segments already exists within the service area. Furthermore, the resource requirement, that is, e.g., the requirement of computing capacity and storage capacity, is estimated. Depending on the result, it is possible to generate geographic segments (anew), it being possible to select the geometric shape of the segments in such a way that only few transition region, that is, boundary regions or overlapping regions arise. Thus, for example, boundary regions or overlapping regions of the geographic segments may be preferably provided at particularly safety-critical locations, such as, e.g., in the areas of intersections or entrance ramp lanes, or the like. For determining the geographic segments, it is also possible to use already available information about the objects existing within the service area, such as, e.g., the number of objects and/or the object density in specific regions of the service area.

A management instance 707, e.g., of a cloud management, may also provide information to the split algorithm about the availability and respective computing capacity of additional process instances. This information may be provided preferably via an interface.

A communication unit 709, e.g., a V2X stack with collective perception (CPS) may also provide information for the split algorithm as to whether a segmentation of the message transmission has already occurred based on a message size and, if so, what segments and how many segments are used (as described in EP 22199984).

For this purpose, it is in particular advantageous that due to the changing conditions in a cloud environment, which is used in parallel also by other users (other users use more/less computing capacity, servers are switched on/off), an interface is provided, from which information can be read as to which instances with which computing capacities are available.

Furthermore, it is thus advantageously possible to obtain information of a V2X stack with the geographic segmentation of the CPM (collective perception message) V2X messages as interface. Here, advantageously, identical or similar segments may be used for creating the environment model as well as for producing and transmitting messages and unnecessary computations of new segments may be avoided.

What is claimed is:

1. A method for creating an environment model for a service area, wherein a service is provided within the service area for the infrastructure-based support of an at least partially automated networked motor vehicle, the method comprising the following steps:

dividing the service area into multiple geographic segments;

receiving sensor data, which are attributed with geographic coordinates, and assigning the sensor data to at least one geographic segment as a function of the geographic coordinates;

assigning each geographic segment to a selected process instance, wherein the process instance is a computational entity configured to process sensor data for the assigned geographic segment; and computing a respective partial environment model for each geographic segment by the process instance assigned to the geographic segment based on the assigned process instance, the partial environment model including information describing positions, velocities, and classifications of objects within the geographic segment.

2. The method as recited in claim 1, wherein a number and/or sizes of the geographic segments and/or the assignment of a respective geographic segment to a process instance is adapted dynamically, as a function of an expected number of object within the respective geographic segment, and in such a way that the number of the expected objects is substantially the same for every geographic segment.

3. The method as recited in claim 1, wherein multiple geographic segments are assigned to one process instance.

4. The method as recited in claim 1, wherein a specific process instance is assigned precisely to one geographic segment, wherein the geographic segment varies in size.

5. The method as recited in claim 4, wherein the size of the geographic segment is varied as a function of a number of objects within the geographic segment.

6. The method as recited in claim 4, wherein the size and shape of the geographic segment is received via an external interface, from a V2X protocol stack.

7. The method as recited in claim 1, wherein the sensor data are distributed by a coordination instance or by an algorithm, to the assigned process instance.

8. The method as recited in claim 1, wherein in an additional integration step an overall environment model is determined from the partial environment models.

9. The method as recited in claim 1, wherein the at least one geographic segment includes at least two of the geographic segments which are defined in such a way that they adjoin each other directly.

10. The method as recited in claim 1, wherein the at least one geographic segment includes at least two of the geographic segments which are defined in such a way that they include an overlapping spatial region.

11. The method as recited in claim 1, wherein the at least one geographic segment includes at least two of the geographic segments, and wherein, in the computation of the respective partial environment model, objects are determined, which because of their moving direction and speed will leave a first geographic segment within a certain time span and cross over into an adjacent, second geographic segment, wherein information about the determined objects is handed over by the process instance assigned to the first geographic segment to the process instance assigned to the second geographic segment and/or information about the determined objects is taken into account in the computation of an overall environment model.

12. The method as recited in claim 1, wherein the sensor data include data that are produced by at least one stationary environment sensor, which is situated within the service area.

13. The method as recited in claim 1, wherein the sensor data include data that are produced by at least one environment sensor of a motor vehicle, which is moving within the service area.

14. The method as recited in claim 1, wherein the sensor data include image data and/or distance data and/or a point cloud.

15. The method as recited in claim 1, wherein at least one partial environment model is processed further and results of the further processing are transmitted to at least one at least partially automated networked motor vehicle.

16. A system for creating an environment model for a service area, wherein within the service area, a service for the infrastructure-based support of an at least partially automated networked motor vehicle is provided, wherein the system comprises:

a plurality of process instances; and a receiver interface configured to receive sensor data, which are attributed with geographic coordinates;

wherein the system is configured to divide the service area into multiple geographic segments;

wherein a processor is configured to allocate the received sensor data to at least one geographic segment as a function of the geographic coordinates and to assign each of the geographic segments to a selected process instance of the process instances, wherein the process instance is a computational entity configured to process sensors data for the assigned geographic segment and wherein each process instance is configured to compute a respective partial environment model for each geographic segment assigned to the process instance based on the assigned process instance, the partial environment model including information describing positions, velocities, and classifications objects within the geographic segment.

17. A non-transitory machine-readable storage medium on which is stored a computer program including commands for creating an environment model for a service area, wherein a service is provided within the service area for the infrastructure-based support of an at least partially automated networked motor vehicle, the commands, when executed by a computer, causing the computer to perform the following steps:

dividing the service area into multiple geographic segments;

receiving sensor data, which are attributed with geographic coordinates, and assigning the sensor data to at least one geographic segment as a function of the geographic coordinates;

assigning each geographic segment to a selected process instance, wherein the process instance is a computational entity configured to process sensors data for the assigned geographic segment; and computing a respective partial environment model for each geographic segment by the process instance assigned to the geographic segment based on the assigned process instance, the partial environment model including information describing positions, velocities, and classifications objects within the geographic segment.

* * * * *